May 22, 1962 C. W. BERTHIEZ 3,035,496
MACHINE-TOOL HEAD
Filed July 5, 1957 12 Sheets-Sheet 1
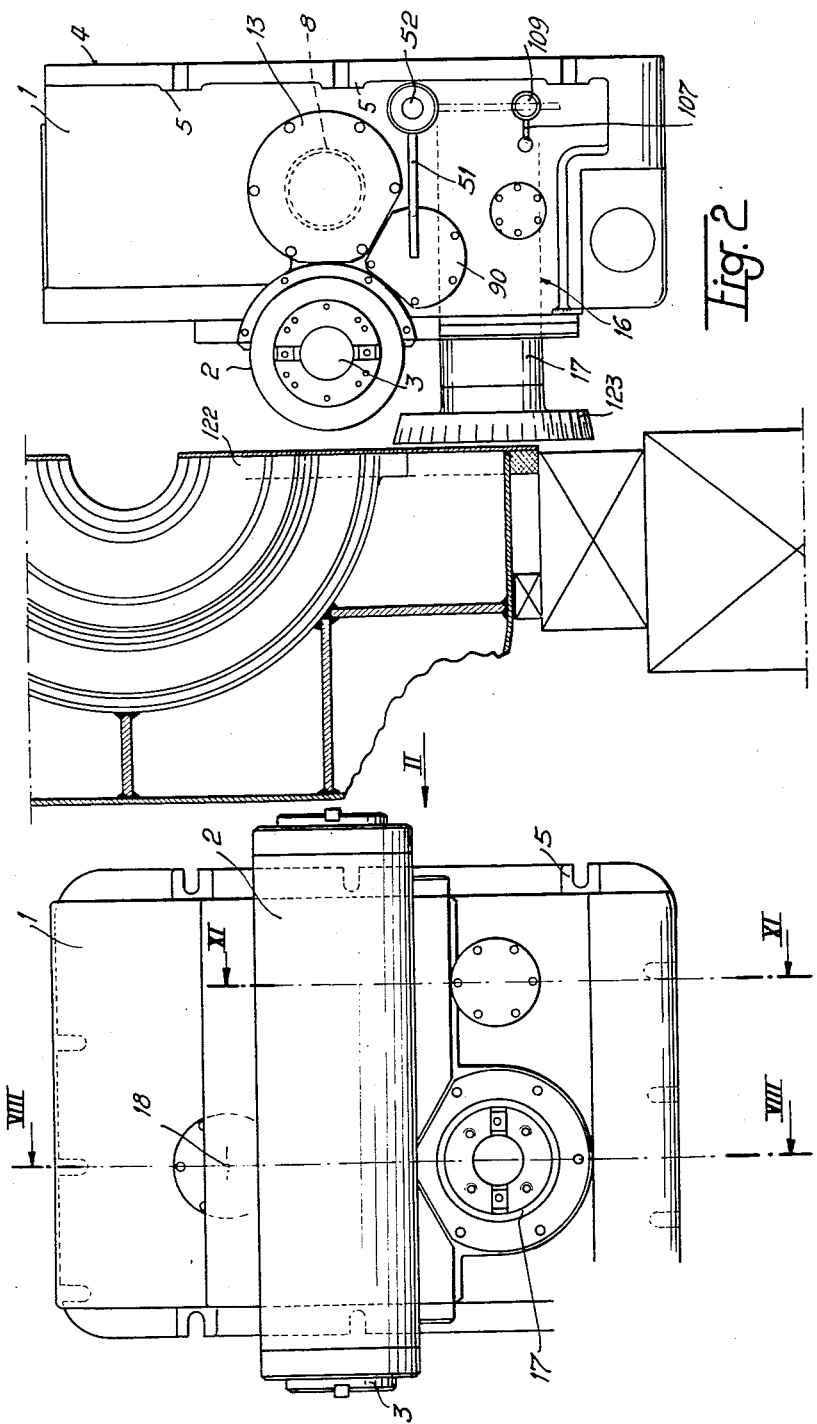

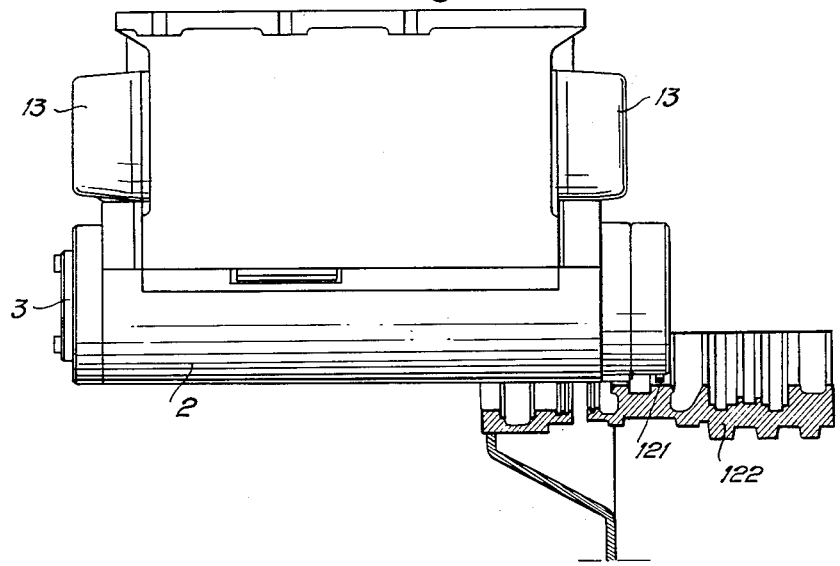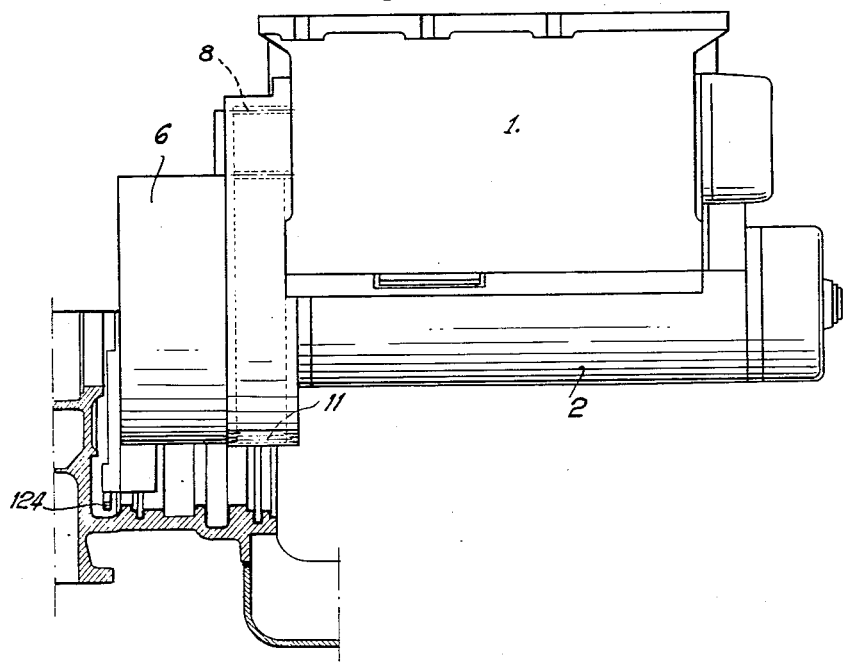

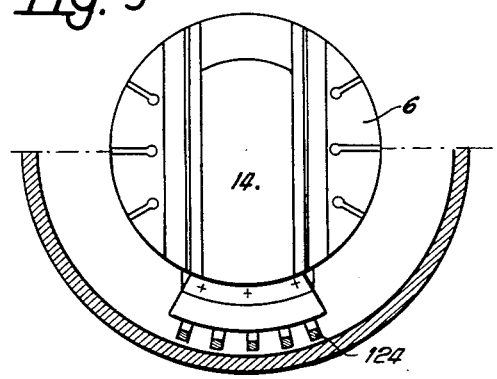
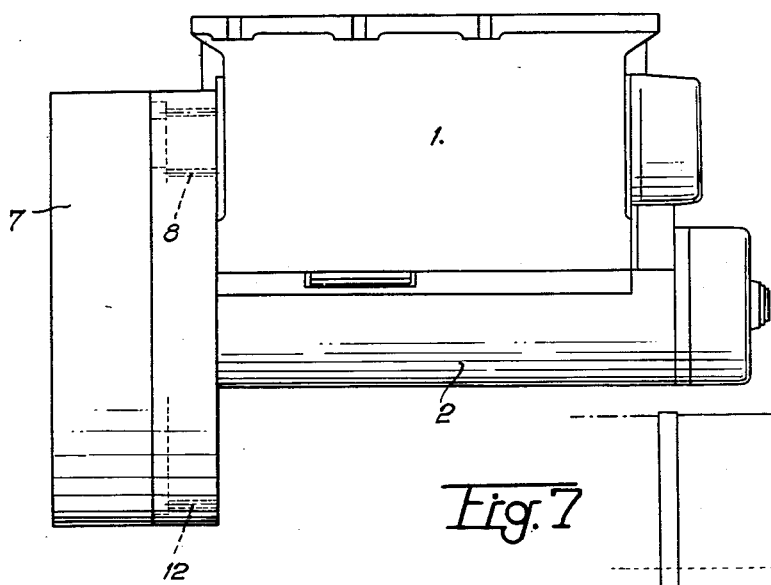
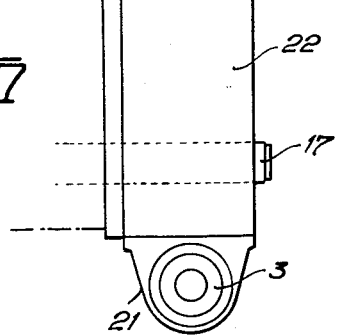

May 22, 1962

C. W. BERTHIEZ 3,035,496

MACHINE-TOOL HEAD

Filed July 5, 1957

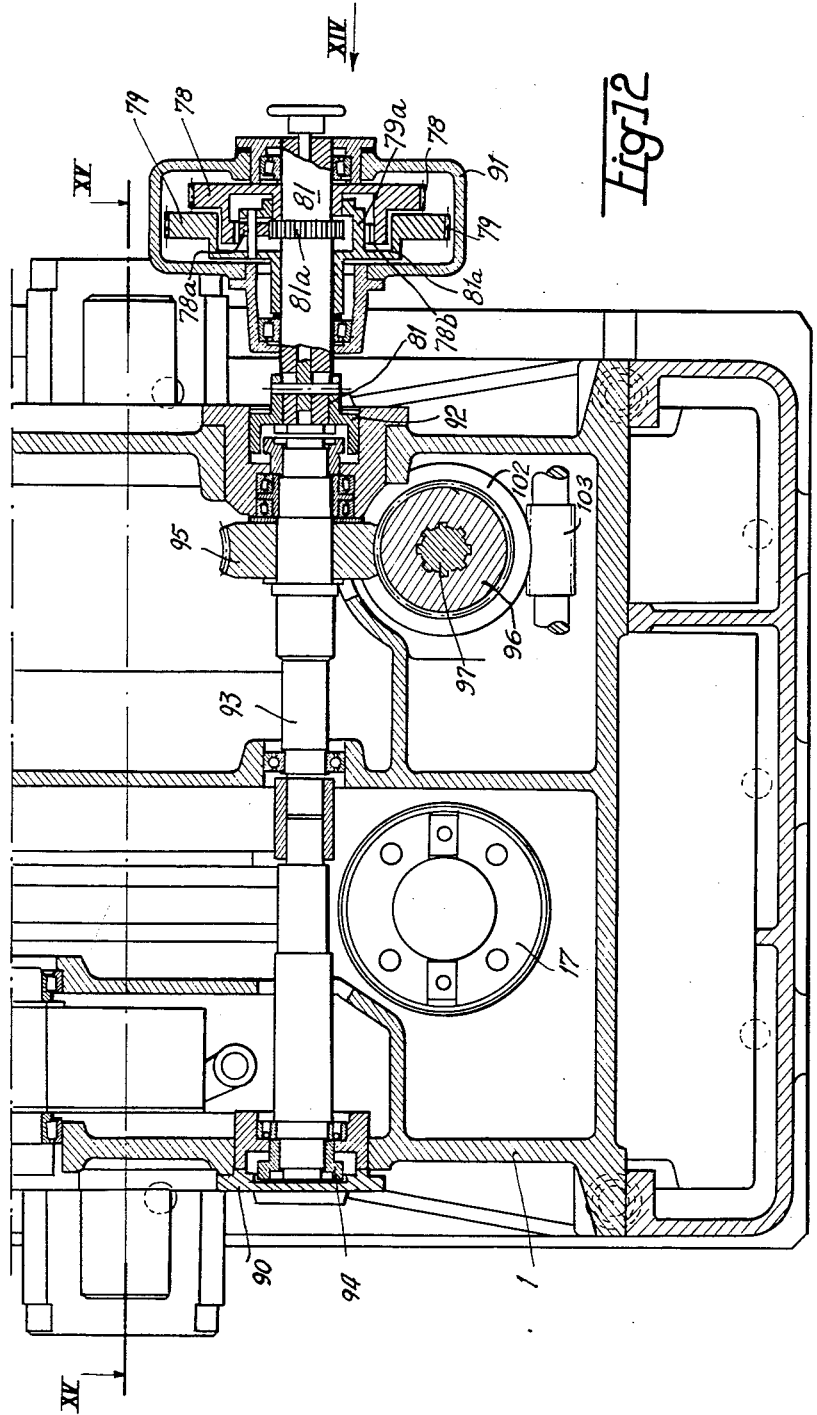

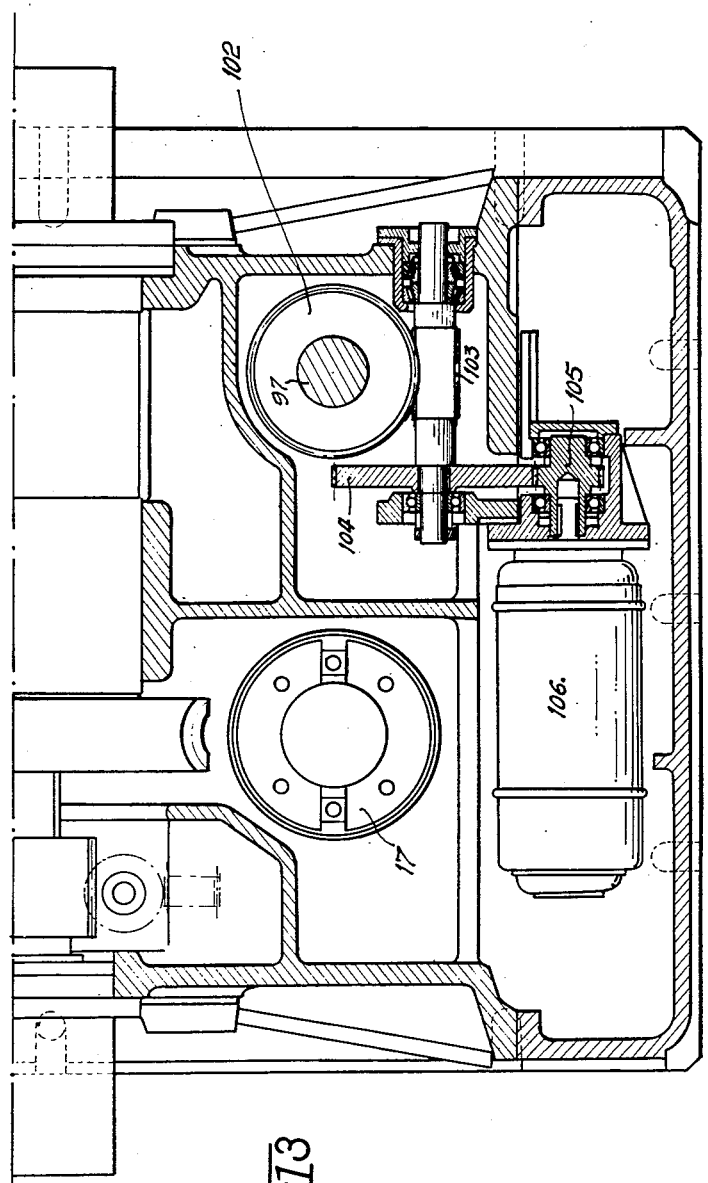

May 22, 1962 C. W. BERTHIEZ 3,035,496
MACHINE-TOOL HEAD
Filed July 5, 1957 12 Sheets-Sheet 11

May 22, 1962 C. W. BERTHIEZ 3,035,496
MACHINE-TOOL HEAD
Filed July 5, 1957 12 Sheets-Sheet 12
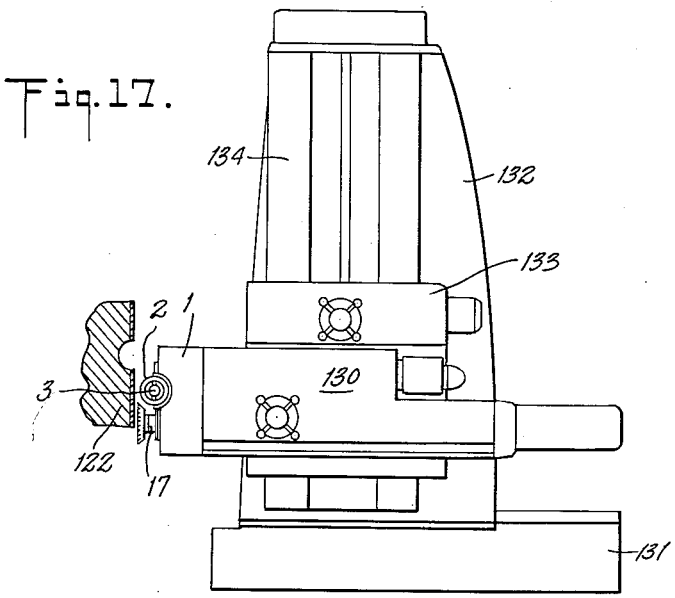
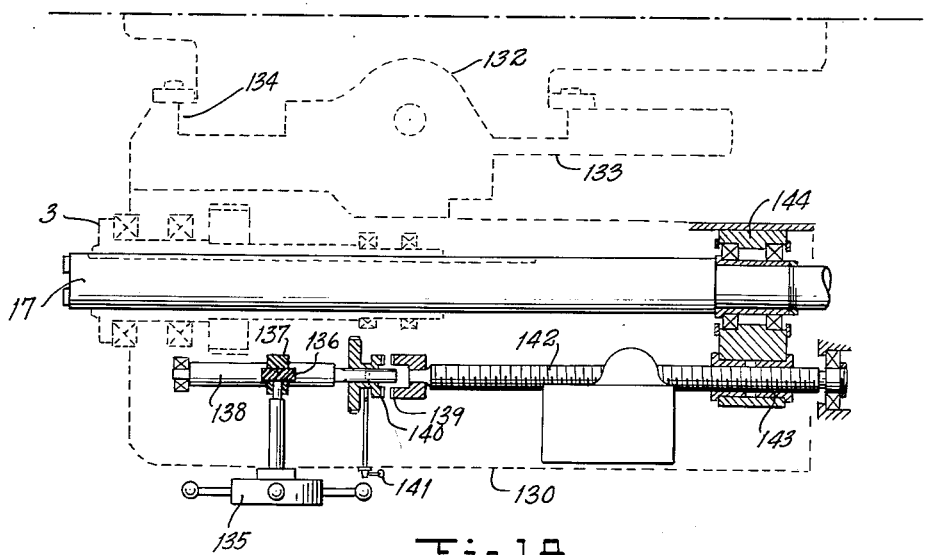
INVENTOR.
CHARLES WILLIAM BERTHIEZ
BY
ATTORNEYS United States Patent Office 3,035,496
Patented May 22, 1962

3,035,496
MACHINE-TOOL HEAD
Charles William Berthiez, Paris, France, assignor to Societe dite: Innocenti Societa Generale per Industria Metallurgica e Meccanica, Milan, Italy
Filed July 5, 1957, Ser. No. 670,260
Claims priority, application France July 7, 1956
15 Claims. (Cl. 90—14)

This invention relates generally to machine-tools, and particularly to improved means for machining the inner surfaces of recessed work, such as workpieces having part-cylindrical recesses.

Objects of the invention include the provision of improved means for machining large-sized internally recessed work such as the casings of turbines, diesel engines, reducers, and similar heavy parts; the provision of an improved machine-tool head for this purpose which will have wide adaptability to existing types of machine-tools; the provision of such a machine-tool head which will be extremely versatile and permit a variety of machining operations to be performed on work of many different shapes and sizes. Further objects are to improve the accuracy and ease with which such machining operations can be performed. Yet other objects will appear.

Many large-size, heavyweight parts of the kind referred to herein are in the form of mating semi-cylindrical shells, having mating bearing surfaces at their ends for receiving a turbine rotor shaft, a crankshaft, or similar heavy shaft journalled between them. The inner mating semi-cylindrical surfaces require boring and surfacing operations to be performed thereon. Heretofore, such operations were usually carried out by means of boring bars of considerable length and weight, supported in an intermdiate rest support, and driven at one end from the spindle of the machine-tool, such as an horizontal miller and borer. The cutting tools were secured to the free end of the bar, either directly for smaller-diameter bores, or by way of tool-supporting plates or discs for the larger diameters, radial feed means being sometimes provided for the tool where internal surfacing operations are involved. The two mating casing sections (or equivalent work) to be machined were supported in their desired mating relationship, and the boring bar was then made to project into the enclosure formed by them through an end bearing aperture of the casing in order to machine the internal surfaces simultaneously in both sections. This conventional method has a number of serious drawbacks as a result of which high accuracy was not generally attainable, work was slow, and rejects frequent.

One reason is that the long boring bar or shaft serving to transmit the cutting torque to the tool or tools was usually required to have a disproportionately small diameter (as compared to its length and the high machining resistances encountered) in order to be able to pass through the end bearing apertures of the work. At the same time the bar may have to rotate large-radius tool-carrier plates to take care of large-diameter internal boring and surfacing operations. Hence, it was necessary to keep the cutting torque transmitted to relatively low values to prevent dangerous bending and torsional vibrations of the bar from being set up which would seriously impair the accuracy of the machining operations.

Moreover, every time the tool had to be adjusted or replaced or dimensions inspected, it was necessary to dismantle the two sections of the work in order to gain access to the interior. Generally speaking the work was thus performed in "blind" conditions, i.e. it was difficult or impossible to check the progress of the work visually as it proceeded. All this has required highly skilled operators to be put on the work and in spite of this a high proportion of the valuable blank castings had to be scrapped.

Of course there is the possibility of machining the two recessed sections of the casing (or equivalent work) separately, in an attempt to overcome the difficulties just mentioned. While this procedure does permit permanent visual checking of the work as it progresses, it does not eliminate those above-mentioned difficulties that arise from the excessive length of the bar. Moreover the further difficulty is introduced that the bar has to be adjusted with perfect accuracy at the same position when successively machining the two mating casing sections, on strictly coincident geometrical axes. In practice this requirement usually leads to intolerably high machining errors.

Specific objects of this invention are to eliminate the difficulties analyzed above.

In accordance with the invention, each recessed workpiece, such as a casing section of the kind desribed above, is machined separately, by means of a specially designed machine-tool head to be presently described, which eliminates the requirement for a boring bar with its accompanying drawbacks, and which at the same time is adapted to ensure high geometrical accuracy in the relative position of the tool and each of the two mating sections that are successively machined.

In accordance with an important aspect of the invention, there is provided a machine-tool head, for machining a recessed workpiece, said head comprising a body, a spindle, and means for mounting said spindle for rotation relative to the body with the spindle and spindle-mounting means forming a generally semi-cylindrical protrusion projecting clear of said body so as to be freely fittable into the recess in the work, tool means on the spindle preferably on both ends thereof and engageable with the surface of the recess in the work, and means for rotating the spindle. In the preferred arrangement, the spindle is positioned to protrude in such a manner from the body of the machine-tool head that the geometrical axis of the part-cylindrical surface defined by the protruding spindle, i.e. the axis of spindle rotation, may be made to coincide exactly with the geometrical axis of the concave part-cylindrical surface of the recess in the work.

The head and spindle assembly thus provided entirely replaces the boring bar heretofore used, eliminating the long unsupported length present in the latter and thereby permitting the transmission of much higher machining torques without any danger of the spindle bending or vibrating objectionably since the spindle is firmly supported by the head for rotation, the head in turn being firmly attached to some suitable supoprting member of the machine tool, such as a headstock of an horizontal milling and boring machine. Machining accuracy and speed are thus greatly enhanced.

A machine-tool head according to the invention is capable not only of boring and surfacing internal surfaces, but likewise milling the planar mating surfaces, at the plane of joint between two mating casing sections or the like.

An exemplary embodiment of the invention will now be described for purposes of illustration but not of limitation, with reference to the accompanying drawings, wherein:

FIG. 1 is a front view of an improved machine-tool head;

FIG. 2 is a corresponding side view as seen on arrow II of FIG. 1;

FIG. 3 is a corresponding view in plan;

FIG. 4 is similar to FIG. 3 showing a small tool carrier disc or plate mounted on the spindle of head head;

FIG. 5 is a front view of the disc shown in FIG. 4;

FIG. 6 is similar to FIG. 3 showing a large tool-carrier disc or plate mounted on the spindle;

Figure 8:
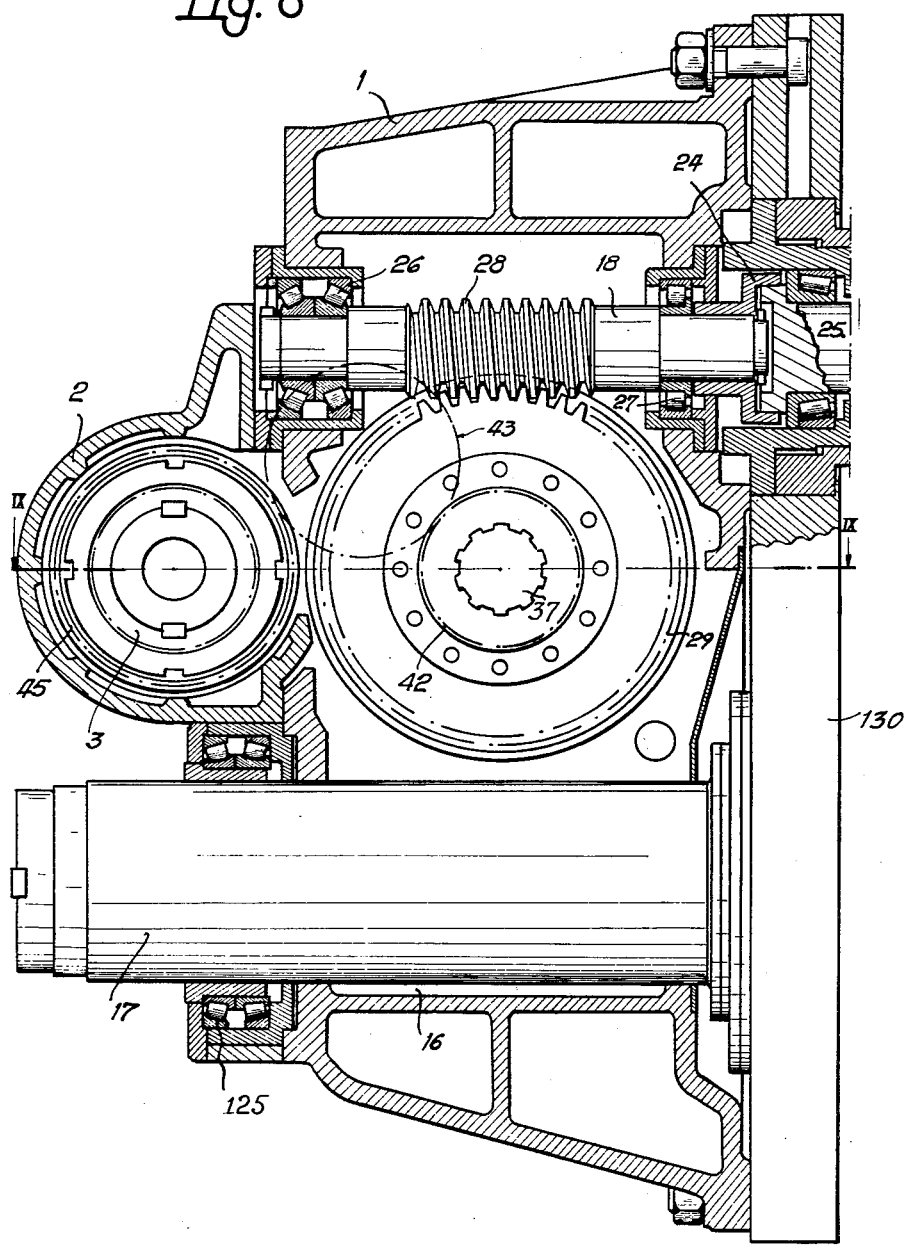
Figure 9:
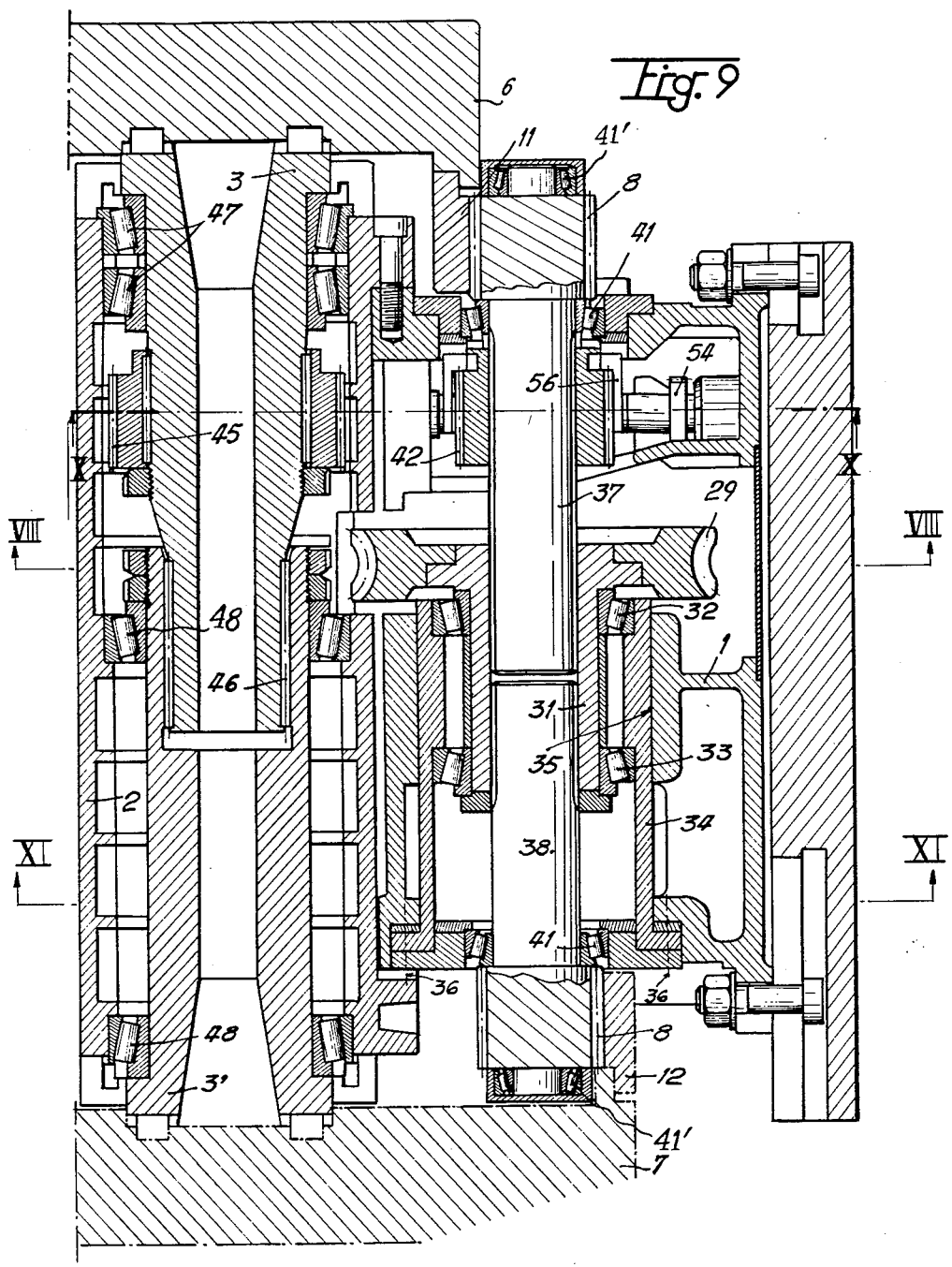
Figure 10:
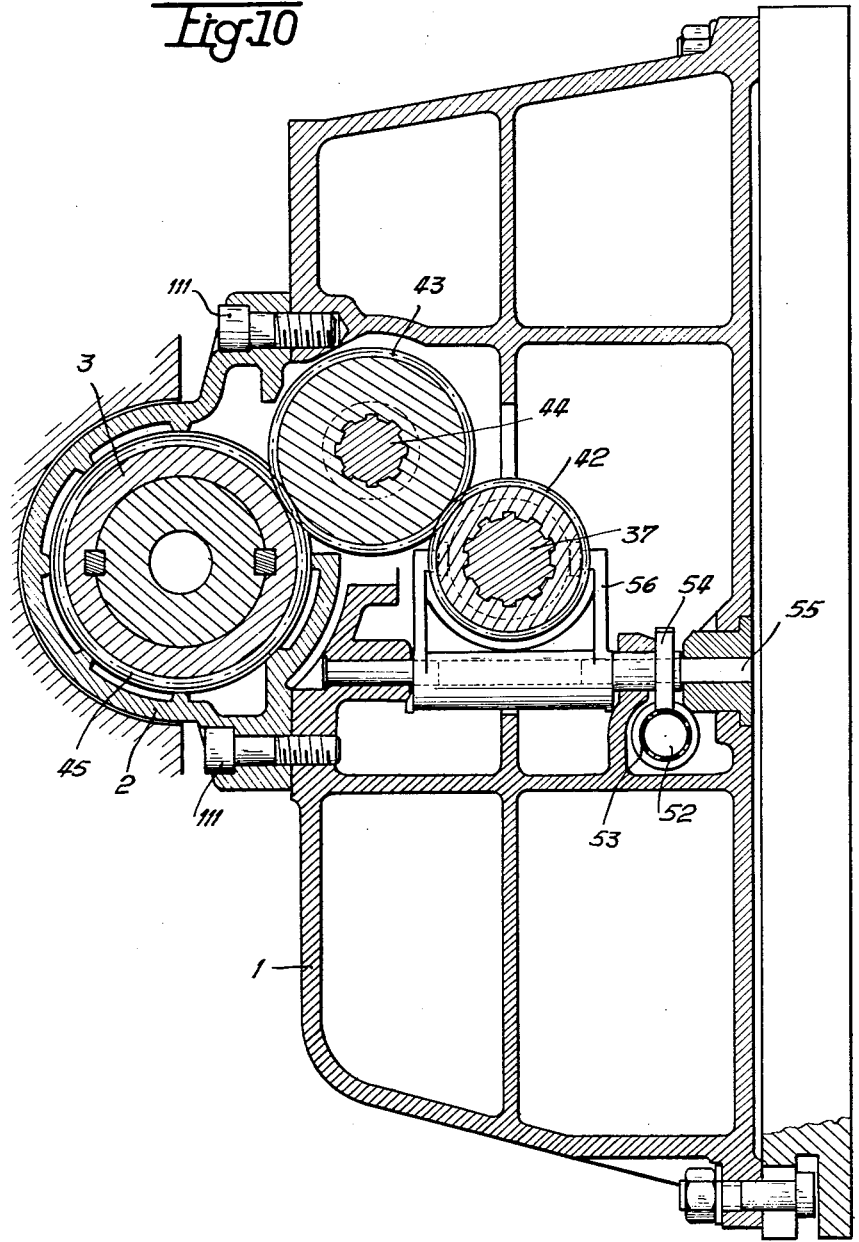
Figure 11:
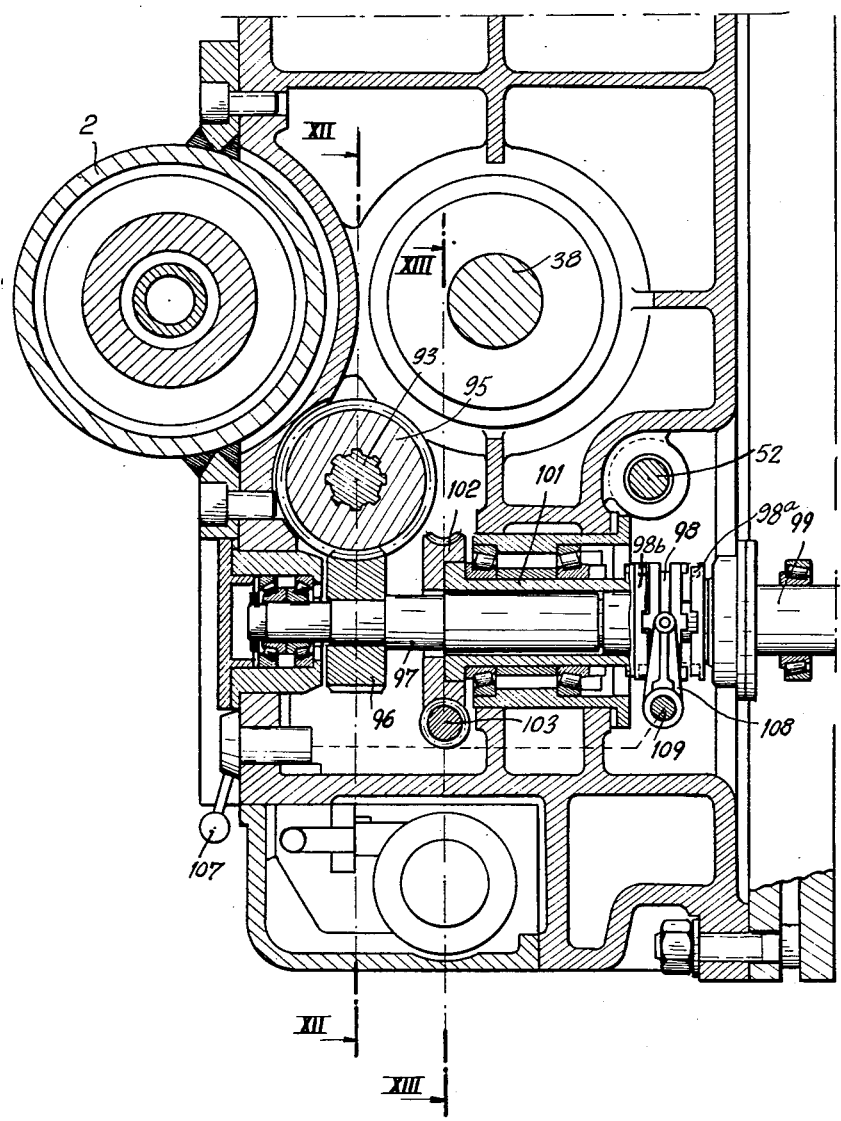
Figure 16:
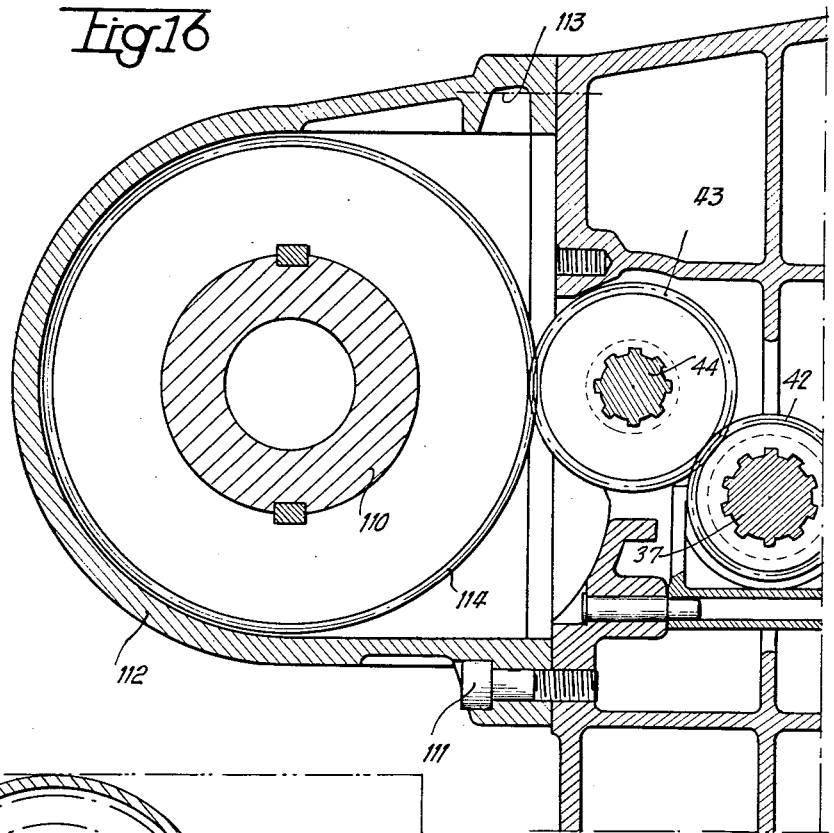
Figure 14:
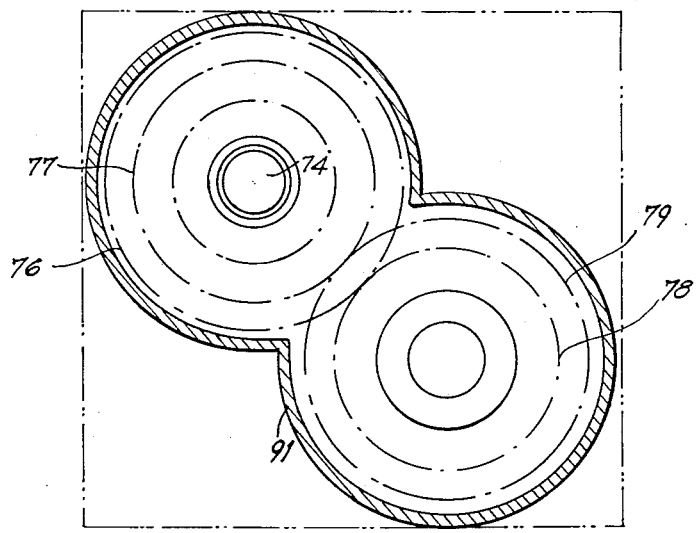
Figure 15:
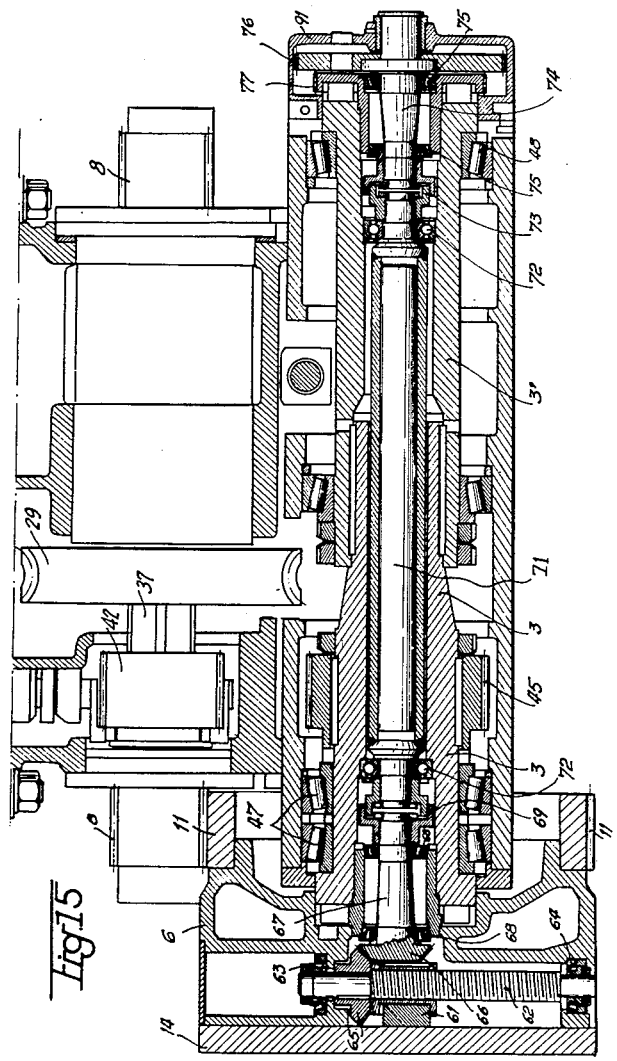

FIG. 7 diagrammatically illustrates a modified embodiment wherein the spindle is positioned in a different manner on the head;

FIG. 8 is a larger-scale view in vertical section on line VIII—VIII of FIG. 1;

FIG. 9 is a horizontal section on line IX—IX of FIG. 8;

FIG. 10 is a vertical section on line X—X of FIG. 9;

FIG. 11 is a partial vertical section on line XI—XI of FIGS. 9 and 12, drawn to the same scale as FIGS. 8 to 10;

FIG. 12 is a partial vertical section on line XII—XII of FIG. 11;

FIG. 13 is a partial vertical section on line XIII—XIII of FIG. 11;

FIG. 14 is a partial diagrammatic side view from the right in FIG. 12;

FIG. 15 is a partial horizontal section on line XV—XV of FIG. 12;

FIG. 16 is similar to FIG. 10 showing the manner in which spindles of different capacity may be mounted on a common head;

FIG. 17 is an elevational view of a milling and boring machine embodying the invention; and FIG. 18 is a longitudinal cross-section on an enlarged scale showing means for rotatably and slidably supporting the main spindle of the machine of FIG. 17.

Referring first to FIGS. 1 to 3, there is shown a machine-tool head according to the invention which essentially comprises a body 1. To the front face of the body any one of a number of spindle-carriers such as 2 is selectively attachable, having a tool-carrier spindle 3 journalled in it, the spindle-carriers and spindles differing in capacity from one another.

The rear face of body 1 is a flat surface 4 rectified throughout its area so as to be applicable against a flat bearing surface of a milling-and-boring machine headstock 130, or equivalent member of a machine-tool. The manner in which the body 1 may be mounted on the headstock 130 of a milling and boring machine is illustrated in FIG. 17 of the drawings wherein is depicted generally a milling and boring machine of the type disclosed in applicant's U.S. Patent No. 2,674,925 dated April 13, 1954, and which comprises an upright 132 carried by and adapted to slide on a bed 131, and a saddle 133 slidably mounted on the vertical guideways 134 of the upright and carrying the headstock 130 for horizontal slidable movement thereon. Alternatively, the said head may be secured to an arm movable along a vertical standard of the machine-tool. In the construction shown, the body may be secured to its support by means of bolts and nuts, the latter engaging the upper faces of bosses such as 5.

The spindle 3 is adapted to have tools secured to either end of it. There may also be secured to the spindle 3 a small tool-carrier disc such as 6 in FIG. 4, or a large disc 7 as shown in FIG. 6. Either disc may be secured to either end of the spindle, as desired. Where the tools are directly mounted on the spindle, the spindle is driven in rotation by means of an internally arranged drive pinion as will be later described. If on the other hand the tools are mounted through the intermediary of a disc such as 6 or 7, the disc is driven in rotation through a drive pinion 8 meshing with a gear annulus integrally connected with the disc, such annulus being formed with external teeth as at 11 in the case of the smaller disc (FIG. 4), and with internal teeth as at 12 in connection with the later disc (FIG. 6).

In the absence of a tool carrier disc being mounted on the spindle, the corresponding drive pinion 8 is protected by means of a hood 13 (FIGS. 2 and 3). Drive pinions such as 8 are provided one at each side of the head to provide for the drive of tool carrier discs mounted on one or the other end of the spindle 3.

The tool carrier discs 6 and 7 are preferably provided with radially slidable carriage means, such as the carriage 14 in FIG. 5, described in greater detail further on.

According to an important feature of the invention, the portion of the spindle-carrier 2 projecting beyond the end is generally shaped as a semi-cylindrical surface so as to be capable of projecting into the recess of a workpiece such as a casing section or shell, when the spindle-carrier is brought into coaxial alignment with the axis of the recess in the work, as illustrated in FIG. 3. Thus, for optimum working conditions, the largest size of spindle-carrier 2 should be selected capable of entering into the recess of the work. If the machine is being used with large-diameter bores, a plate or disc 6, 7 of corresponding diameter should be mounted as shown in FIG. 4, 5 and 6.

In the preferred embodiment illustrated, the head is adapted to be mounted on the rectified front face of the headstock 130 of an horizontal milling-and-boring machine and the body 1 is formed with a bore 16 through which the spindle 17 of the miller-and-borer is adapted to extend (see FIGS. 1, 2 and 8) so that the machine spindle may be used without having to dismantle the head. The spindle 17 is rotatably and slidably mounted in the headstock 130 as is usual and as is disclosed in applicant's aforesaid Patent No. 2,674,925 and more particularly in FIG. 4 of such patent, a portion of the latter of which is incorporated herein as FIG. 18 for purposes of convenient illustration. As shown in FIG. 18, the spindle 17 may be associated with a collar 144 fixed to a nut 143 adapted to move longitudinally over a screw spindle 142 held against axial displacement by two end bearings therefor. The left-hand end of the screw spindle 142, as viewed in FIG. 18, may be connected by claws provided on a sleeve 139 with similar claws formed on a gear wheel 140. To the shaft 138 supporting gear wheel 140, is keyed a gear 137 meshing with a gear 136 mounted on one end of a transverse shaft to the other end of which is connected a turnstile 135. A lever 141 keyed to a transverse rod provided with a fork engaging a groove in the gear wheel 140 allows displacement of such gear wheel along the shaft 138 so as to provide for the engagement or disengagement of the cooperating claws on the sleeve 139 and gear wheel 140. The aforesaid members form the spindle feed control means to be operated directly through the turnstile 131. The power means for accomplishing this purpose are also disclosed in said Patent No. 2,674,925 but a detailed explanation here of such means is believed unnecessary for an understanding of the instant invention.

The head spindle 3 is driven in rotation from a power take-off shaft 18 (FIG. 8), to be later described in greater detail, the axis of which is indicated at 18 in FIG. 1. It will be understood that the head may be bodily swung in the plane of the rear support face of the body 1 about an axis 18, whereby the spindle 3 of the head can be made to assume any desired angled condition between horizontal and vertical. If it is desired that the spindle 17 of the machine be operable while the head is in position with the spindle 3 of the head in some other position than horizontal, and particularly in the vertical position of the head spindle, it would of course be necessary to provide a corresponding passage through the head body, for accommodating the spindle of the machine.

In the form of embodiment so far described, FIGS. 1–6, the spindle-carrier 2 arrangement permits operation on recessed shell-shaped work, wherein the plane of joint is arranged vertically on the machine for machining operations, i.e. the spindle-carrier 2 is positioned on the front face of the head. Alternatively however, the spindle-carrier may just as well be arranged under the head, as shown at 21 in FIG. 7, thereby permitting work on workpieces having their plane of joint horizontally disposed. In FIG. 7, there has further been shown at 17, the extremity of the miller-and-borer spindle which is made to extend through the machining head 22, the head spindle being there designated with the same reference numeral 3 as in the other figures.

Having thus broadly outlined the general arrangement of the machine head according to the invention, means will now be described for rotating the head spindle and for radially feeding the sliders across the blocks independently of spindle rotation.

The means for rotating the spindle and plates or discs are visible in FIGS. 8, 9 and 10. The shaft 18 is rotated through a dog clutch coupling 24 from a shaft 25 journalled in the headstock 130 of the miller-and-borer, on which the head is mounted, and directly rotated from the motor driving the spindle of the machine. The shaft 18 is journalled in the spaced roller bearings 26, 27 respectively mounted in the front and rear walls of the body 1. Formed on the central part of the shaft is a worm 28 which engages with a wormwheel 29 having recessed teeth, including an elongated hub 31 FIG. 9, journalled in spaced roller bearings 32, 33 mounted in a sleeve 34 fitted in a bore 35 formed in body 1. The sleeve 34 is held in the body 1 by means of screws schematically indicated by the center lines 36 thereof which extend through an end flange of sleeve 34 and engage threaded holes in the body 1.

The hub 31 of recessed gear 29 serves as a sliding clutch member for connecting and disconnecting a pair of coaxial shaft sections 37, 38 the outer ends of which carry the respective drive pinions 8 for driving the tool carrier discs as previously mentioned. Each shaft section is supported at one end in the hub 31 of the gear and at its other end by a roller bearing 41 and 41' mounted in body 1. The portion of shaft 38 engaged in the hub 31, as well as the corresponding bore in the latter, are splined to ensure driving engagement. The shaft section 37 is splined over a greater length and has a gear 42 slidable on it, this gear in the position shown meshing with an idler gear 43 secured on a shaft 44, FIG. 10, journalled in body 1. The gear 43 in turn meshes at all times with a gear 45 keyed on the head spindle 3. This spindle, actually, is made up of two spindle sections 3, 3', FIG. 9, coupled by way of a splined coupling 46. The spindle 3, 3' is journalled at its end near the drive gear 45 by means of a dual-roller bearing 47 and at its opposite end by means of a pair of roller bearings 48 which are secured in the spindle carrier 2.

When a tool carrier disc or plate 6, 7 is mounted on the spindle, the slider gear 42 is moved towards the gear 29 so as to be disengaged from gear 43. The slider gear 42 is displaceable by acting on either of two levers 51 (see FIG. 2) on each side of the head and secured on a pin 52 journalled in the head about an axis parallel to that of spindle 3. Secured on pin 52 is a helical gear 53, FIG. 10, meshing with a helical gear 54 secured on a shaft 55 normal to 52. Secured on shaft 55 is a fork 56 having the ends of its tines engaging an annular groove in the drive gear 42.

It will be understood that when the lever is shifted from the horizontal position shown in full lines in FIG. 2 to the vertical position shown in dot-dash lines, and vice versa, the shafts 52 and 55 are turned one quarter of a revolution, whereby slider gear 42 may be selectively engaged with or disengaged from the intermediate gear 43 as desired.

In brief, it is seen that the kinematic drive chain transmitting rotational drive to the spindle 3 includes the shaft 25, coupling 24, shaft 18, worm 28, worm gear 29, shaft section 37, gear 42 (in clutched-in position), intermediate gear 43, spindle gear 45, and spindles 3 and 3'. The drive chain for transmitting rotational drive to the tool carrier discs or plates includes shaft 25, coupling 24, shaft 18, worm 28, worm gear 29, shaft section 37, and either one of the gears 8 secured on the ends of the shaft sections 37, 38 according as the disc is mounted on one or the other end of the spindle. FIG. 9 illustrates a small disc 6 similar to that shown in FIG. 4, driven by an external annulus 11 meshing with gear 8. If a large disc 7, as shown in FIG. 6, were mounted instead of disc 6, the inner annular gear 12 thereof would similarly mesh with the same gear 8. Such a large disc 7 and its annulus 12 with internal teeth are shown in FIG. 9 in dotted outline at the opposite end of the spindle 3, 3' from the disc 6 to indicate that, while either disc may be mounted at either end of the spindle 3, 3', both discs 6 and 7 may not be mounted in engagement with the respective gears 8 at the same time since the meshing of the gears 8 with the gears 11, 12 would lock the drive.

The motor from which shaft 25 is driven, i.e. the motor powering the main spindle of the milling and boring machine on which the improved machine head is mounted, is preferably a variable-speed motor, so that the speed of rotation of the head spindle and discs may be adjusted at will. It will be seen that, owing to the manner in which these members are mounted, the speed of rotation of the smaller disc is lower than that of the spindle, and that the rotational speed of the larger disc is lower than that of the smaller disc. In this way linear cutting speeds may be obtained that will be substantially the same for a given speed of the drive motor, hence for a given value of the power rating of said motor.

The feed displacements of the tool carrier spindle in the three space coordinates are produced by corresponding movements of the headstock or other machine component on which the head is mounted.

Means will now be described for imparting radial feed displacements to the slides mounted on the discs, at velocities independent of the rotational speed of the spindle. Particular reference will be made to FIGS. 11 to 15.

Radial carriage or slide 14 (FIG. 15) mounted on disc 6 is integrally connected with a nut 61 cooperating with a lead screw 62 supported in disc 6 by means of spaced roller bearings 63, 64 in which the screw is rotatable without axial displacement. Keyed on the screw 62 is a bevel gear 65 meshing with a bevel gear 66 secured on a shaft 67 journalled in roller bearings 68 coaxially with the spindle 3. The shaft 67 is connected by way of a coupling 69 with a central shaft 71 journalled coaxially with spindle 3 in spaced ball bearings 72 and connected in turn through a coupling 73 with a shaft 74 journalled coaxially with the spindle in spaced roller bearings 75. Secured on the outer end of shaft 74 is a gear 76 and secured on the adjacent end of the spindle 3' is a further gear 77. Gears 76 and 77 respectively mesh with gears 78, 79 (FIGS. 12 and 14) journalled on a counter shaft 81 and connected with each other by way of a differential gearing. As shown more clearly in FIG. 12 of the drawings, the differential gearing includes a planet carrier 79a provided on the gear 79, and together with the latter supporting the ends of a pin on which a planet gear 78a is rotatably mounted. The planet gear meshes with a sun gear 81a secured to the shaft 81 and with a ring gear 78b provided on the gear 78. As above indicated, the gears 79 and 78 respectively mesh with gears 77 and 76, which respectively are carried by the spindle 3' and the central shaft 71. The differential gearing is so dimensioned that the speed of rotation of spindles 3 and 3' will not affect the speed of rotation of shaft 74 nor hence the speed of displacement of carriage 14.

Enclosing bodily the differential gearing and gears 76 and 77 is a casing 91. The shaft 81 is connected through coupling 92 with a shaft 93 the far end of which is provided with a similar coupling 94. The general arrangement is such that the entire differential assembly is bodily reversible so as to be mounted on the opposite side of the head, whereby shaft 81 is then engaged with coupling 94, so that in this position it will impart feed displacement to the carriage of a disc mounted on the other end of the spindle, in the same way as described above. For this purpose shafts 67 and 74, FIG. 15, are interchangeable and can be coupled with central shaft 71 at one or the other end of each of said shafts 67, 74, by way of couplings 69 and 73. A cover 90 may be put in place at the end of the shaft 93 opposite to the differential.

Secured on shaft 93 is a recessed gear 95 meshing with a worm 96 secured on a shaft 97 (also see FIG. 11). Slidably splined on shaft 97 is a clutch dog 98 adapted to be moved into engagement selectively with a clutch member 98a on a feed shaft 99 journalled on the headstock (or other machine component supporting the head), or with a clutch member 98b on a sleeve 101 secured to a worm gear 102 (also see FIG. 13), which latter meshes with a worm 103 having a gear 104 secured to it, FIG. 13. Gear 104 meshes with a gear 105 carried by the shaft of a variable speed electric motor 106. Clutch dog 98 is axially shifted by actuating a hand lever 107 (see FIGS. 11 and 12) operating a fork 108 pivoted on a pivot 109, through any suitable linkage or other drive indicated diagrammatically by the dotted line, FIG. 11.

Thus it is seen in connection with the feed displacement of carriage 14 on plate or disc 6 that any desired feed rate may be imparted to said carriage independently of the rate of rotation of the disc, and that this drive can be imparted either from the feed shaft 99 journalled in the headstock of the cutting and boring machine, or from the individual motor 106 mounted in the head according as dog 98 is shifted into engagement with shaft 99 or with sleeve 101 through actuation of lever 107.

In order to increase the capacity of the head, means are provided according to the invention to mount spindle carriers of more than one diameter upon a common head. Thus, referring to FIG. 10, there is shown a spindle carrier 2 of one size, secured to the body 1 with screws 111, the spindle being driven in rotation through a gear 45 meshing with a gear 43. Referring to FIG. 16 on the other hand, a spindle-carrier 112 of larger size is shown, secured by means of the same screws 111 in its lower part, but wherein the upper securing screws are displaced as shown at 113 in the drawing. The spindle 110, likewise of increased size, is driven through a gear 114 meshing with the same intermediate gear 43.

A head of the type described above is able to perform a wide variety of machining operations. FIG. 3 illustrates a tool 121 mounted on the head spindle for internally boring a turbine casing 122 in the form of a shell having its plane of joint disposed vertically, as may also be seen from FIG. 2.

FIG. 2 further illustrates the manner in which the said plane of joint may be rectified by means of a milling cutter 123 mounted on the end of main spindle 17 of the cutting and boring machine, it being noted that such operation is permitted by the fact that the machine spindle 17 extends through the head 1, as previously indicated. The spindle 17 in this case is supported in a dual-roller bearing 125 (see FIG. 8). A spindle-carrier of larger capacity, or a disc, as shown by way of example in FIG. 4, may be used, with a tool or tools 124 secured to the carriage thereof (also see FIG. 5). More than one tool may be arranged one behind the other, displaced by intervals corresponding to the thickness of material to be removed.

As previously mentioned, the head spindle 3, 3' may be positioned in any desired direction including the vertical or at any desired angle in the vertical plane normal to the axis of the cutting and boring machine spindle 17, a feature which greatly increases machining possibilities and the range of usefulness of the device.

Where the work is in the form of a shell having an horizontal plane of joint, as already mentioned, machining heads according to the invention may be used having the spindle disposed beneath the body as shown in FIG. 7.

It will be understood that the invention is not restricted to the form of embodiment illustrated and described by way of example or to the variations mentioned. Many modifications may be made therein by those familiar with the art depending on the particular use to which the machine is to be put, without exceeding the scope of the invention.

What I claim is:

1. An auxiliary tool head for mounting on a machine tool having a supporting member, a main spindle supported by said supporting member for rotation of said spindle on an axis extending generally in the direction from said supporting member toward a workpiece and for axial movement of said spindle relative to said member forwardly toward and reversely away from said workpiece to and from a position of said spindle projecting beyond said member, said workpiece having a recess adapted to be machined to a semi-circular contour and disposed with the axis of the semi-circular contour transverse to said spindle axis, and means for effecting relative movement between said spindle supporting member and said workpiece transversely of said axis of said semi-circular contour, said tool head comprising a body, means for supporting said body on said member in the mounted position of said tool head with said body disposed forwardly of said supporting member in the direction of extension of said main spindle and so as to provide for said rotation and said axial movement of said main spindle to said projected position unobstructed by said body, an auxiliary spindle located on the forward outer end of said body in the direction of extension of said main spindle, means supporting said auxiliary spindle so that it is positioned as a whole on and outwardly of said forward outer end of said body with its axis extending in the mounted position of said tool head transversely of and in transversely offset relation to said axis of said main spindle to provide for mutually unobstructed operation of said main spindle and of said auxiliary spindle on portions of said workpiece in advance of said forward outer end of said body, a power transmission shaft for said auxiliary spindle carried by said body and disposed in spaced, substantially parallel relation to said main spindle, said auxiliary spindle supporting means being disposed outwardly from said forward outer end of said body and clear of said main spindle in its projected position and having a contour about the axis of said auxiliary spindle to provide for freely entering said recess of said workpiece upon said relative movement of said main spindle supporting member and said workpiece one toward the other in the direction of the axis of said main spindle for machining a surface of semi-circular contour upon rotation of said auxiliary spindle with a tool carried thereby in engagement with said recessed workpiece.

2. An auxiliary tool head for mounting on a machine tool having a supporting member, a main spindle supported by said supporting member for rotation of said spindle on an axis extending generally in the direction from said supporting member toward a workpiece and for axial movement of said spindle relative to said member forwardly toward and reversely away from said workpiece to and from a position of said spindle projecting beyond said member, said workpiece having a recess adapted to be machined to a semi-circular contour and disposed with the axis of the semi-circular contour transverse to said spindle axis, and means for effecting relative movement between said spindle supporting member and said workpiece transversely of said axis of said semi-circular contour, said tool head comprising a body, means for supporting said body on said member in the mounted position of said tool head with said body disposed forwardly of said supporting member and so as to provide for said rotation and said axial movement of said main spindle to said projected position unobstructed by said body, an auxiliary spindle, means supporting said auxiliary spindle on and outwardly of said body with its axis extending in the mounted position of said tool head transversely of and in transversely offset relation to said axis of said main spindle to provide for mutually unobstructed operation of said main spindle and of said auxiliary spindle, said auxiliary spindle supporting means being disposed outwardly of said body and clear of said main spindle in its projected position and having a contour about the axis of said auxiliary spindle to provide for freely entering said recess of said workpiece upon said relative movement of said main spindle supporting member and said workpiece one toward the other for machining a surface of semi-circular contour upon rotation of said auxiliary spindle with a tool carried thereby in engagement with said recessed workpiece, a tool-carrier plate carried by said auxiliary spindle at a given end thereof for rotation therewith, a tool carrier supported on said plate for movement radially with respect to said auxiliary spindle axis, and means carried by said body and operatively connected to said tool carrier and operable to effect said radial movement of said tool carrier upon operation of said means.

3. An auxiliary tool head as defined in claim 2 in which said means operatively connected to said tool carrier and operable to effect said radial movement of said tool carrier comprises a differential mechanism having an element thereof operatively connected to said tool carrier and an element operatively connected to said auxiliary spindle, said differential mechanism being operable to effect feeding movement of said tool carrier and rotation of said spindle independently of each other.

4. An auxiliary tool head as defined in claim 3 which comprises an auxiliary shaft supported by said body coaxially with said auxiliary spindle, one end of said auxiliary shaft being operatively connected to said tool carrier for effecting said radial movement of said tool carrier upon rotation of said auxiliary shaft and the other end of said auxiliary shaft being operatively connected to said first element of said differential mechanism.

5. An auxiliary tool head as defined in claim 2 which comprises a motor supported by said body, and a driving connection between said motor and said means operatively connected to said tool carrier for effecting said radial movement of said tool carrier upon operation of said motor.

6. An auxiliary tool head as defined in claim 2 which comprises a drive shaft supported by said body for rotation on the axis of said drive shaft, a gear on said drive shaft and rotatable therewith, and a plurality of tool carrier plates of different diameter selectively mountable on an end of said auxiliary spindle and each carrying an annular gear rotatable on the axis of and with said auxiliary spindle, said annular gears each being of such diameter and disposed so as to mesh said drive shaft gear upon mounting of the respective tool carrier plates on said auxiliary spindle.

7. An auxiliary tool head as defined in claim 2 which comprises a plurality of tool carrier plates of different diameter selectively mountable on an end of said auxiliary spindle and each carrying a gear rotatable on the axis of and with said auxiliary spindle, said gears being of different diameters respectively corresponding to the different diameters of said tool carrier plates, the smaller of said gears providing a ring having external teeth and the larger of said gears providing a ring having internal teeth, a drive shaft supported by said body for rotation on the axis of said drive shaft, and a gear mounted on said drive shaft for rotation therewith and so as to be disposed in meshing relation with the teeth on the ring of a selected tool carrier plate when mounted on said auxiliary spindle so as to drive said selected carrier plate.

8. An auxiliary tool head for mounting on a machine tool having a supporting member, a main spindle supported by said supporting member for rotation of said spindle on an axis extending generally in the direction from said supporting member toward a workpiece and for axial movement of said spindle relative to said member forwardly toward and reversely away from said workpiece to and from a position of said spindle projecting beyond said member, said workpiece having a recess adapted to be machined to a semi-circular contour and disposed with the axis of the semi-circular contour transverse to said spindle axis, and means for effecting relative movement between said spindle supporting member and said workpiece transversely of said axis of said semi-circular contour, said tool head comprising a body, means for supporting said body on said member in the mounted position of said tool head with said body disposed forwardly of said supporting member and so as to provide for said rotation and said axial movement of said main spindle to said projected position unobstructed by said body, a hollow auxiliary spindle, means supporting said auxiliary spindle on and outwardly of said body with its axis extending in the mounted position of said tool head transversely of and in transversely offset relation to said axis of said main spindle to provide for mutually unobstructed operation of said main spindle and of said auxiliary spindle, said auxiliary spindle supporting means being disposed outwardly of said body and clear of said main spindle in its projected position and having a contour about the axis of said auxiliary spindle to provide for freely entering said recess of said workpiece upon said relative movement of said main spindle supporting member and said workpiece one toward the other for machining a surface of semi-circular contour upon rotation of said auxiliary spindle with a tool carried thereby in engagement with said recessed workpiece, a tool carrier plate carried by said auxiliary spindle at a given end thereof for rotation therewith, a tool carrier supported on said plate for movement thereof radially with respect to said auxiliary spindle axis, a feed shaft supported within and coaxial with said hollow auxiliary spindle for rotation of said auxiliary spindle and said feed shaft with respect to each other, means operatively connecting said feed shaft to said tool carrier for effecting said radial movement of said tool carrier upon rotation of said feed shaft relative to said auxiliary spindle, a differential mechanism operatively connected to said feed shaft and to said auxiliary spindle and operable to effect relative rotation of said feed shaft with respect to said auxiliary spindle, and means operatively connected to said differential mechanism for operating said differential mechanism to effect said relative rotation of said feed shaft with respect to said auxiliary spindle to produce said radial movement of said tool carrier on said tool carrier plate.

9. An auxiliary tool head as defined in claim 8 which comprises a drive shaft supported by said body for rotation on the axis of said drive shaft, a gear train connecting said drive shaft to said tool carrier plate and said auxiliary spindle and effective to rotate said tool carrier plate and said auxiliary spindle upon rotation of said drive shaft.

10. An auxiliary tool head as defined in claim 8 in which said differential mechanism comprises a gear carried upon said auxiliary spindle for rotation therewith, a gear carried upon said feed shaft for rotation therewith, transmission gears respectively meshing with said gears carried by said auxiliary spindle and by said feed shaft, and means providing a driving connection between said differential mechanism and said transmission gears and operable to effect differential rotation of said meshing gears and differential rotation of said auxiliary spindle and said feed shaft with respect to each other.

11. An auxiliary tool head as defined in claim 10 in which said last means comprises a counter shaft for effecting said differential operation upon rotation of said counter shaft, and driving means operatively connected to said counter shaft for rotating said counter shaft to effect said differential operation and said feeding movement of said tool carrier.

12. An auxiliary tool head for mounting on a machine tool having a supporting member, a main spindle supported by said supporting member for rotation of said spindle on an axis extending generally in the direction from said supporting member toward a workpiece and for axial movement of said spindle relative to said member forwardly toward and reversely away from said workpiece to and from a position of said spindle projecting beyond said member, said workpiece having a recess adapted to be machined to a semi-circular contour and disposed with the axis of the semi-circular contour transverse to said spindle axis, and means for effecting relative movement between said spindle supporting member and said workpiece transversely of said axis of said semi-circular contour, said tool head comprising a body, means for supporting said body on said member in the mounted position of said tool head with said body disposed forwardly of said supporting member and so as to provide for said rotation and said axial movement of said main spindle to said projected position unobstructed by said body, an auxiliary spindle, means supporting said auxiliary spindle on and outwardly of said body with its axis extending in the mounted position of said tool head transversely of and in transversely offset relation to said axis of said main spindle to provide for mutually unobstructed operation of said main spindle and of said auxiliary spindle, a power transmission shaft for said auxiliary spindle carried by said body and disposed in spaced, substantially parallel relation to said main spindle, said auxiliary spindle supporting means being disposed outwardly of said body and clear of said main spindle in its projected position and having a contour generally semi-circular in section about and at the side of the axis of said auxiliary spindle away from said body so that said auxiliary spindle supporting means may freely enter the semi-circular recess of said workpiece upon said relative movement of said main spindle supporting member and said workpiece one toward the other for machining a surface of semi-circular contour upon rotation of said auxiliary spindle with a tool carried thereby in engagement with said recessed workpiece.

13. An auxiliary tool head for mounting on a machine tool having a supporting member, a main spindle supported by said supporting member for rotation of said spindle on an axis extending generally in the direction from said supporting member toward a workpiece and for axial movement of said spindle relative to said member forwardly toward and reversely away from said workpiece to and from a position of said spindle projecting beyond said member, said workpiece having a recess adapted to be machined to a semi-circular contour and disposed with the axis of the semi-circular contour transverse to said spindle axis, and means for effecting relative movement between said spindle supporting member and said workpiece transversely of said axis of said semi-circular contour, said tool head comprising a body, means for supporting said body on said member in the mounted position of said tool head with said body disposed forwardly of said supporting member and so as to provide for said rotation and said axial movement of said main spindle to said projected position unobstructed by said body, an auxiliary spindle, means supporting said auxiliary spindle on and outwardly of said body with its axis extending in the mounted position of said tool head transversely of and in transversely offset relation to said axis of said main spindle to provide for mutually unobstructed operation of said main spindle and said auxiliary spindle, said auxiliary spindle supporting means being disposed outwardly of said body and clear of said main spindle in its projected position and having a contour about the axis of said auxiliary spindle to provide for freely entering said recess of said workpiece upon said relative movement of said main spindle supporting member and said workpiece one toward the other for machining a surface of semi-circular contour upon rotation of said auxiliary spindle with a tool carried thereby in engagement with said recessed workpiece, and means demountably securing said auxiliary spindle supporting means to said body and providing selectively for securing on said body, auxiliary spindle supporting means of different diametrical dimensions for supporting auxiliary spindles suitable for different diameters of the recesses of said workpiece.

14. An auxiliary tool head for mounting on a machine tool having a supporting member, a main spindle supported by said supporting member for rotation of said spindle on an axis extending generally in the direction from said supporting member toward a workpiece and for axial movement of said spindle relative to said member forwardly toward and reversely away from said workpiece to and from a position of said spindle projecting beyond said member, said workpiece having a recess adapted to be machined to a semi-circular contour and disposed with the axis of the semi-circular contour transverse to said spindle axis, and means for effecting relative movement between said spindle supporting member and said workpiece transversely of said axis of said semi-circular contour, said tool head comprising a body, means for supporting said body on said member in the mounted position of said tool head for rotational movement about an axis to different angularly related positions with respect to said member and with said body disposed forwardly of said supporting member and so as to provide for said rotation and said axial movement of said main spindle to said projected position unobstructed by said body, a power transmission shaft carried by said body coaxial with said axis of rotational movement and coaxial with and connectible in the mounted position of said head to a power drive shaft supported on said member, an auxiliary spindle, means supporting said auxiliary spindle on and outwardly of said body with its axis extending in the mounted position of said tool head transversely of and in transversley offset relation to said axis of said main spindle to provide for mutually unobstructed operation of said main spindle and of said auxiliary spindle, said auxiliary spindle supporting means being disposed outwardly of said body and clear of said main spindle in its projected position and having a contour about the axis of said auxiliary spindle to provide for freely entering said recess of said workpiece upon said relative movement of said main spindle supporting member and said workpiece one toward the other for machining a surface of semi-circular contour upon rotation of said auxiliary spindle with a tool carried thereby in engagement with said recessed workpiece.

15. An auxiliary tool head for mounting on a machine tool having a supporting member, a main spindle supported by said supporting member for rotation of said spindle on an axis extending generally in the direction from said supporting member toward a workpiece and for axial movement of said spindle relative to said member forwardly toward and reversely away from said workpiece to and from a position of said spindle projecting beyond said member, said workpiece having a recess adapted to be machined to a semi-circular contour and disposed with the axis of the semi-circular contour transverse to said spindle axis, and means for effecting relative movement between said spindle supporting member and said workpiece transversely of said axis of said semi-circular contour, said tool head comprising a body, means for supporting said body on said member in the mounted position of said tool head with said body disposed forwardly of said supporting member and so as to provide for said rotation and said axial movement of said main spindle to said projected position unobstructed by said body, an auxiliary spindle, means supporting said auxiliary spindle on and outwardly of said body with its axis extending in the mounted position of said tool head transversely of and in transversely offset relation to said axis of said main spindle to provide for mutually unobstructed operation of said main spindle and of said auxiliary spindle, a power transmission shaft for said auxiliary spindle carried by said body and disposed in spaced, substantially parallel relation to said main spindle, said auxiliary spindle supporting means being disposed outwardly of said body and clear of said main spindle in its projected position and having a contour generally semi-circular in section about and at the side of the axis of said auxiliary spindle away from said body so that said auxiliary spindle supporting means may freely enter the semi-circular recess of said workpiece upon said relative movement of said main spindle supporting member and said workpiece one toward the other for machining a surface of semi-circular contour upon rotation of said auxiliary spindle with a tool carried thereby in engagement with said recessed workpiece, said auxiliary spindle being formed at each end thereof for carrying a tool supporting plate adapted to be mounted on either end of said spindle, and means carried by said body and operatively connectible in driven relation to said power transmission shaft in said body and to said tool supporting plate in the mounted position thereof at either end of said auxiliary spindle and operable to effect rotation of said plate.

References Cited in the file of this patent

UNITED STATES PATENTS

| | | |
|---|---|---|
| 941,269 | Pearn | Nov. 23, 1909 |
| 1,188,339 | Sinderson | June 20, 1916 |
| 2,497,842 | Armitage et al. | Feb. 14, 1950 |
| 2,685,122 | Berthiez | Aug. 3, 1954 |
| 2,744,450 | Walter | May 8, 1956 |

FOREIGN PATENTS

| | | |
|---|---|---|
| 726,701 | Great Britain | Mar. 23, 1955 |